FIG. 2

INVENTORS
G. G. LIGHT
E. J. AGNEW
G. W. JANSON
BY M. R. Marsh
ATTORNEY

FIG. 3

April 2, 1946. G. G. LIGHT ET AL 2,397,553
SUPERVISORY APPARATUS FOR TELEGRAPH SYSTEMS
Filed March 9, 1943 6 Sheets-Sheet 4

FIG. 4

INVENTORS
G. G. LIGHT
E. J. AGNEW
G. W. JANSON
BY
ATTORNEY

April 2, 1946.  G. G. LIGHT ET AL  2,397,553
SUPERVISORY APPARATUS FOR TELEGRAPH SYSTEMS
Filed March 9, 1943  6 Sheets-Sheet 5

INVENTORS
G. G. LIGHT
E. J. AGNEW
BY  G. W. JANSON
M. R. Marsh
ATTORNEY

April 2, 1946. G. G. LIGHT ET AL 2,397,553
SUPERVISORY APPARATUS FOR TELEGRAPH SYSTEMS
Filed March 9, 1943 6 Sheets-Sheet 6

INVENTORS
G. G. LIGHT
E. J. AGNEW
BY G. W. JANSON
ATTORNEY

Patented Apr. 2, 1946

2,397,553

UNITED STATES PATENT OFFICE 2,397,553

SUPERVISORY APPARATUS FOR TELEGRAPH SYSTEMS

George G. Light, Kew Gardens, and Edward J. Agnew, Brooklyn, N. Y., and George W. Janson, Nutley, N. J., assignors to The Western Union Telegraph Company, New York, N. Y., a corporation of New York Application March 9, 1943, Serial No. 478,490

20 Claims. (Cl. 178—2)

This invention relates to telegraph systems such as line switching systems, and more particularly to supervisory apparatus for indicating or recording the particular lines involved in each switching connection.

In line switching systems of this character wherein signals are repeated from one line or channel into another, the switching apparatus provides a temporary connection between the connected lines or between connected receiving and sending positions at which repeaters working into the lines are provided. As long as the connection is maintained between the lines or positions, signals or messages may be repeated from an incoming line or channel to a selected outgoing line or channel. Occasionally, because of failure in the connecting or repeating apparatus, a message is not received at the sending position or is transmitted over the outgoing line in a mutilated condition, perhaps with the address portion of the message rendered undecipherable. In this case the message may be temporarily lost and, when the failure or loss is subsequently discovered tracing the message is difficult after the switching connection is broken down. Although such occurrences are very infrequent, they are of the utmost importance in commercial telegraph systems where even the temporary loss or mutilation of a single message in a large volume of traffic may be of considerable consequence and so serious that every possible precaution is taken to insure that the loss or mutilation of a message will be corrected with the least possible delay.

In general terms it is the principal object of the present invention to provide an improved supervisory recording system or apparatus to facilitate tracing of lost messages or other messages which have been previously transmitted through the exchange or switching office.

Another object of the invention is to provide a supervisory recording system which will indicate which incoming and which outgoing line or channel is involved in each switching operation at the switching office or center.

Another object of the invention in connection with the above is to provide a system to record in a predetermined order such as a consecutive order the lines or channels involved in the consecutive switching operations.

A further object of the invention is to provide a recording device associated with each line or channel and a system for operating the same whereby each received and transmitted message for particular channels are identified by a predetermined numbering arrangement such as by numbering consecutive messages transmitted and received over each channel consecutively, and for indicating the numbers of these messages involved in the consecutively numbered switching operations.

A still further object of the invention is to provide a numbering and identifying arrangement which will operate as outlined above to number message switching operations when consecutive messages received over a particular incoming line or channel are transmitted consectively over a particular outgoing line or channel.

Another still further object of the invention is to provide a supervisory recording system and apparatus which will function in the desired manner to consecutively number switching operations and the messages involved therein when two or more switching connections are made simultaneously.

Another still further object of the invention is to provide a system as outlined above which will permit flexibility of the system and still maintain the desired numbering and identifying features.

Other objects and advantages of the invention will appear from the following description of the preferred embodiment thereof shown in the accompanying drawings, wherein.

Figure 1:
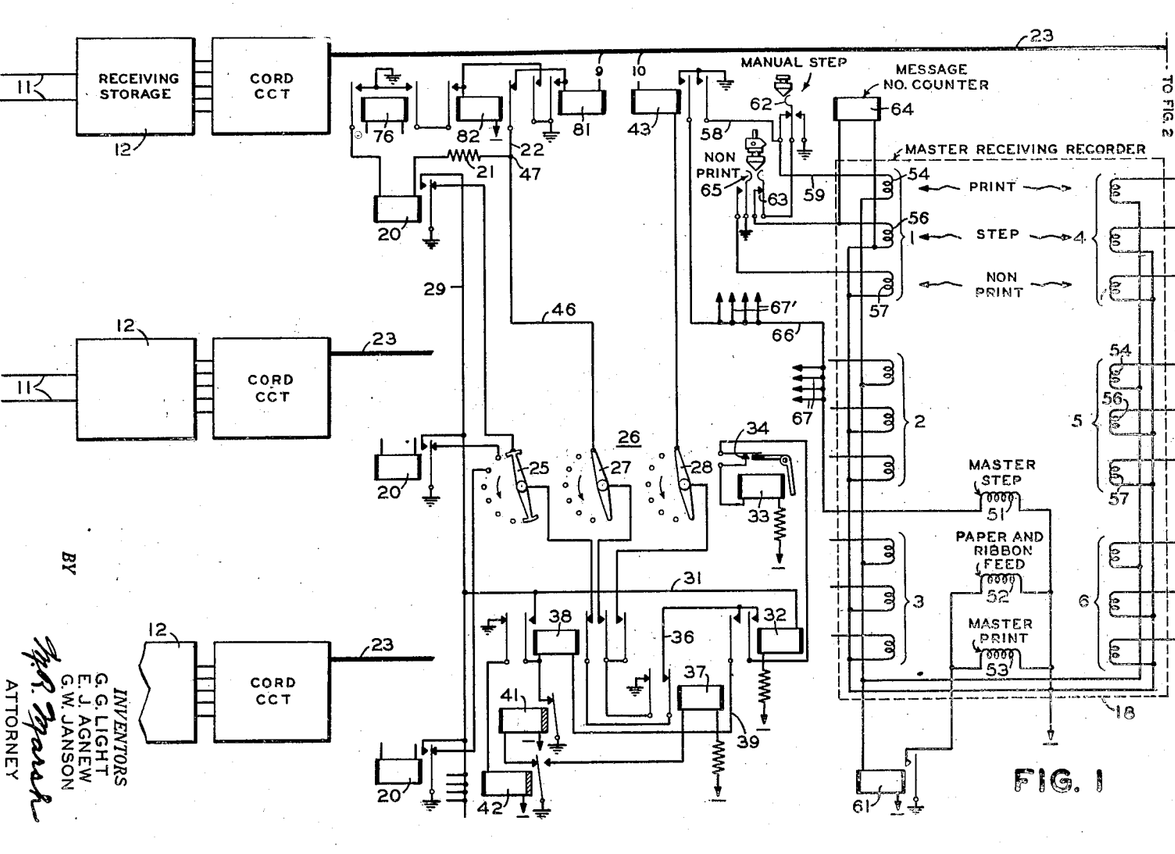
Figs. 1 and 2 are wiring diagrams showing the detailed circuits of an exchange or switching center incorporating the supervisory system and apparatus of the present invention.
Figure 2:
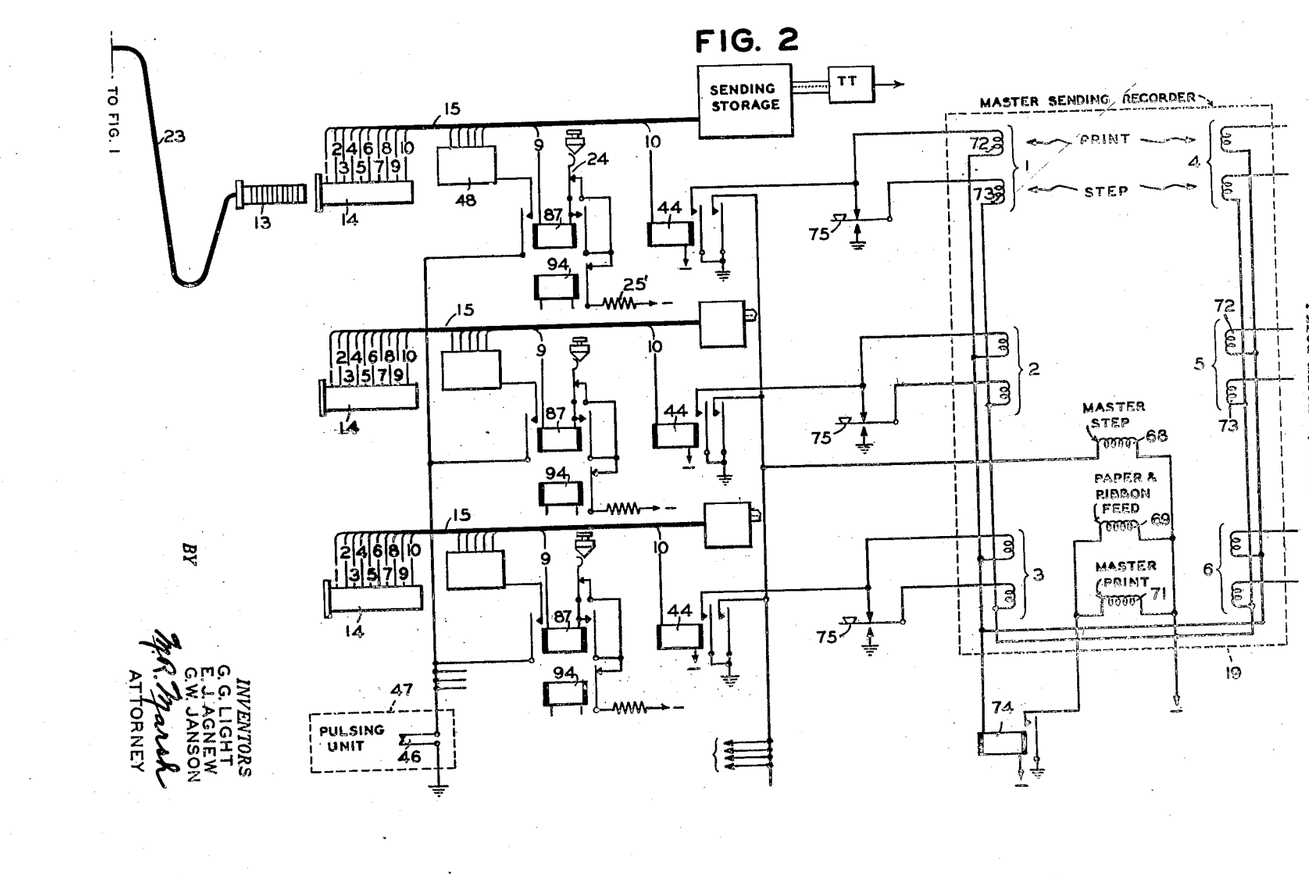

Referring to Figs. 1 and 2 of the drawings, the supervisory recording apparatus is shown as embodied in a telegraph exchange or switching system of the type shown in the patent to Blanton, No. 2,279,295, dated April 14, 1942. In Figs. 1 and 2 switching means of the plug and jack type is shown for interconnecting receiving storage positions associated with incoming lines or channels, with sending storage positions connected to outgoing lines or channels, as illustrated in detail in Figs. 2, 3 and 4 of the above mentioned Blanton patent. As shown in Figs. 1 and 2 of the accompanying drawings, the receiving lines 11 terminate in signal receiving storage and repeating apparatus 12 which may consist of a tape reperforator and tape transmitter, as shown in the Blanton patent. The cord circuits and switching equipment also correspond to those shown in said patent, with relays 81 and 82 of the cord circuit and relays 87 and 94 associated with a switchboard jack of the accompanying drawings corresponding to relays bearing similar reference numbers in Figs. 2, 3 and 4 of said patent. Relays 81 and 87 are seize relays; relay 82 is a holding relay, and relay 94 is the relay associated with the counting chain which operates in response to the end-of-message signal. In view of the fact that the system embodying the present invention may be applied to and is adapted to operate in conjunction with the same switching system as that shown in the said Blanton patent, for the sake of simplicity only enough of the exchange apparatus is shown in the accompanying drawings to illustrate the manner in which the present invention may be applied to the system shown in the said patent. It will also be understood that the invention may be applied to other exchange systems and employed in connection with switching apparatus of other types, for example, the selective switch type.

In telegraph systems of the type under consideration a message which is stored in the repeating equipment 12 is automatically transmitted to an outgoing line or channel or storage equipment associated with the selected one of the switchboard cables 15 following the insertion of the associated plug such as 13 into the one of the jacks 14 associated with the desired outgoing circuit. This connection between the terminal equipment at the receiving and sending positions is obviously only temporary, and if one of the messages is mutilated in transmission or is lost on account of the failure of the connecting equipment or repeating equipment, it is difficult to trace the origin of such a message after the connection is pulled down. In accordance with the present invention, recording or indicating devices are provided for identifying the receiving and sending positions or lines involved in each connection or switching operation.

In the embodiments of the invention illustrated, the above mentioned supervisory equipment comprises a separate receiving recording unit consisting of print, step and non-print magnets provided for each of the receiving positions, as indicated at the right hand side of Fig. 1, while another sending recording unit consisting of print and step magnets is provided for each sending position, as indicated at the right hand side of Fig. 2. Each of the individual receiving recording units are preferably grouped together into one or more master receiving recorders and the individual sending recording units grouped together into one or more master sending recorders. Each of the master recorders also includes a master print, a master step, and a paper and ribbon feed magnet. The detailed construction of a master receiving or sending recorder is illustrated in Figs. 3 to 10 and the operation and arrangements of the elements therein will be described in following paragraphs.

The receiving recording units assigned to each receiving position operate in such a manner that they consecutively number each message received at the particular position and print these message numbers simultaneously with the printing of and alongside the so-called master numbers. The master numbers printed concomitantly with the message numbers are in consecutive order to represent consecutive switching operations completed at the switching center. A sending recording unit associated with each sending position numerically and consecutively numbers each message transmitted over the associated sending channel. The transmitted message numbers are printed in registry with the master number representing the switching operation involving the transmitted message. Thus each master number has in registry therewith a received message number and a transmitted message number.

While the receiving position recording units may be all combined in one master receiving recorder and the sending position recording units combined in one master sending recorder, it will be understood that they may be arranged in various manners, as for example where there are only a few receiving and sending positions at a switching center, all the individual recording units may be in one master recorder.

Each master receiving recorder comprises a print magnet, a step magnet and a non-print magnet for each of the receiving positions associated therewith and in addition has a master step magnet, a master print magnet and a paper and ribbon feed magnet. The master receiving recorder represented by the rectangle 18 of Fig. 1 has six individual receiving recording units. The circuits to only one of the recording units are shown together with those for the master step, print and paper feed magnets. The master sending recorder, indicated by the rectangle 19 in Fig. 2, comprises six individual sending position recording units, together with a master print and a paper and ribbon feed magnet.

The manner in which the above mentioned supervisory equipment comprising the master receiving and sending recorders, which in turn include separate recording units, is employed to assist in tracing lost or mutilated messages is as follows. Let it be assumed that a distant station associated with a particular sending position at the switching center informs the switching center that one or more messages have not been properly received at the distant station. As each message sent over a sending channel is given a number and each message is consecutively numbered, the numbers of the lost messages for the particular channel are sent to the switching center. The attendant at the switching center being informed of the number of a lost message, refers to the record sheet at the master sending recorder and from this determines the master number representing the switching operation involving this particular message. The attendant then refers to the record sheet at the master receiving recorder and determines the receiving position and the number of the message received thereat associated with the master number. The attendant at the switching center is thus cognizant over which receiving channel the message in question was received and also the number of the message as it was received. Thereupon a request is made by the attendant at the switching center to the message originating station for the lost message or the desired part thereof to be repeated or retransmitted. When the repeated message is received at the switching center, it is forwarded to its proper destination. The operation of the supervisory equipment will be described hereinafter in more detail, together with the circuits for operating the same.

The operation of the system shown in Figs. 1 and 2 is as follows, assuming that a message is completely or partly stored in the upper receiving and storage apparatus 12 and that it is desired to relay the message through the switching center to an outgoing channel. The operator or attendant, on observing a supply of tape in the storage apparatus 12 at a receiving position, reads the section of tape, preferably the first part, containing the destination of the associated message and inserts the plug 13 of the associated cord circuit in the proper one of the jacks 14 extending to the desired outgoing channel. If it is assumed that the desired outgoing channel is at this time idle, the insertion of the plug 13 in the associated jack 14 completes a circuit to the relay 76 to cause the energization thereof. The circuit which is completed to cause the energization of the relay 76 is fully described in the above mentioned Blanton patent and will not be repeated herein.

The energization of the relay 76 associated with the cord circuit of the receiving and storage apparatus 12 having a message stored therein and the associated plug 13 thereof being inserted in a jack 14, completes a circuit from ground at the front contact and left hand tongue of the relay 76 through the winding of a relay 20, a resistance 21, conductor 22, the tongue and back contact of the normally deenergized relay 82, the winding of relay 81, the ninth conductor of the cord 23, the ninth contacts of the plug 13 and the jack 14 into which the plug has been inserted, the ninth conductor of cable 15, through the winding of relay 87, the contacts of the normally closed key 24, the back contact and tongue of relay 94, and through resistance 25' to negative battery.

The above described circuit which includes the windings of relays 20, 81 and 87 causes the energization of only relay 20 since the resistance 25' limits the current through the circuit to such a low value that the marginal relays 81 and 87 are not operated. Each cord circuit includes a relay such as 20, the tongues of which are grounded, and the back contacts thereof are connected by individual conductors to individual studs or contacts on the bank contacts associated with the left hand bridging wiper 25 of a stepping switch 26.

The stepping switch 26 includes, besides the bridging wiper 25, other wipers 27 and 28 adapted to rotate with the wiper 25 in the usual manner. The stepping switch 26 is provided in order to select and operate the supervisory equipment each time a connection is set up through the switching mechanism and operates in such a manner, as hereinafter apparent, that if two or more plug-in operations occur simultaneously the switch 26 spaces the attendant recording operations in point of time to permit the common recording equipment to properly function.

The energization of the relay 20 associated with the operated cord circuit, over a circuit hereinbefore described, removes the ground from its associated stud on the bank contacts associated with the bridging wiper 25 and applies the ground to its make or front contact. This completes a circuit from the grounded tongue over the make contact, conductors 29 and 31, through the winding of a relay 32 to negative battery, causing said relay 32 to become energized. The energization of relay 32 completes a circuit from negative battery through the winding of the operating magnet 33 of the stepping switch 26, the interrupter contacts 34 associated therewith, the right hand tongue and make contact of relay 32, conductor 36, back contact and right hand tongue of a relay 37, inner right hand tongue and back contact of a relay 38, through the bridging wiper 25 to the grounded studs associated therewith. The grounded studs or bank contacts associated with the bridging wiper 25 have ground applied thereto from the tongues of relays such as 20 associated with unoperated cord circuits. Thus, the stepping magnet 33 of the stepping switch 26 will step the associated wipers until the bridging wiper 25 reaches and contacts an ungrounded stud, which will be the stud associated with the cord circuit having the plug thereof inserted in a jack. When the stepping switch reaches such a position, which is like that shown in the drawings, assuming the plug of the first cord circuit in a jack, the operating circuit to the stepping magnet 33 is interrupted.

The operation of relay 32 also completes a circuit from battery at one of the terminals of the winding of the stepping magnet 33 over the above described circuit to the make contact of the outer tongue of relay 32 and thence over a conductor 39, through the winding of the relay 38, the make contact and tongue of a normally energized relay 41, to ground. However, the relay 38 is not immediately energized, as it has a high resistance winding, and as long as the bridging wiper 25 is grounded the relay 38 remains in an unenergized condition. When the bridging wiper 25 reaches the ungrounded stud, the direct ground is removed from the normal shunting grounded circuit around the relay 38 whereupon the same becomes energized. The above mentioned high resistance of the relay 38 limits the current in the above described circuit through the winding of the stepping magnet 33 to such a value that it does not operate, and the wipers 25, 27 and 28 remain on the studs corresponding to the operated cord circuit. The relay 41, which is normally energized, is a slow releasing relay, and its energizing circuit is from negative battery through the winding thereof, the make contact and tongue of a normally energized relay 42 to ground. The normally energized relay 42 is also a slow releasing relay and its energizing circuit is from negative battery through the winding therof, the outer left hand tongue and back contact of relay 38, to ground.

As hereinbefore described, when the wiper 25 reaches the ungrounded stud associated with the cord circuit whose plug 13 is in a jack 14, relay 38 becomes energized and completes a circuit from ground at the back contact of the outer tongue of relay 37, through the outer right hand tongue and make contact of relay 38, the wiper 28 of the stepping switch 26, the winding of a relay 43, the tenth conductor of the cord 23, the tenth contacts of the plug and jack 13 and 14, the tenth conductor of the cable 15, through the winding of a relay 44, to negative battery, causing said relays 43 and 44 to become energized. The energization of the two relays 43 and 44 in a manner hereinafter pointed out effect operation of the supervisory equipment to record or print a notation designating which particular receiving and sending positions are involved in the particular switching operation.

The energization of relay 38 through its center right hand tongue applies ground from the grounded outer tongue of the relay 37 through the wiper 27 and conductor 46, to the point 47, and thence over the above described circuit including the windings of relays 81 and 87 to negative battery. The above described circuit draws sufficient current to operate the relays 81 and 87, which are seize relays, and seizes the circuit to prevent other cord circuits from operating thereover in the manner pointed out in the Blanton patent.

The energization of relay 38 at its inner right hand tongue also opens the circuit to the stepping magnet 33 so that when the operated relay 20, associated with the cord circuit having a plug in a jack, releases on being shunted by the operating circuit for relays 81 and 87 to replace ground on the associated stud upon which the wiper 25 is stopped, the stepping magnet will not at this time reoperate. The energization of the relay 38 through its inner left hand tongue also maintains a circuit through the winding of the relay 32 to hold the same energized when the normal operating circuit is interrupted by the release of the operated one of the relays 20. The energization of the relay 38 also by means of its outer left hand tongue and associated back contact opens the circuit through the winding of relay 42 but said relay does not fall back immediately as it is a slow releasing relay.

The operative energization of the relay 81 which occurs after the operation of the relay 38 closes a circuit from ground at its inner tongue through its associated make contact and the windings of relays 81 and 87 to hold said relays in an energized condition until the same is released by the operation of the relay 94 as described in the Blanton patent. The operation of relay 81 also effects the operation of relay 82, the circuit for the said relay 82 being from the grounded outer tongue of relay 81, its associated make contact, through the winding of relay 82 to negative battery. Relay 87, Fig. 2, which is operated simultaneously with relay 81, by means of its right hand tongue and associated make contact shunts out the contacts of the key 24 so that the said circuit is maintained regardless of the condition of the key 24. The operation of relay 87 by means of its left hand tongue and associated make contact completes a circuit from ground through contacts such as 46 of a pulsing unit 47 to a numbering machine such as 48 associated with the cable 15 connected to the selected outgoing channel. The numbering machine 48 thereupon proceeds to transmit to the outgoing channel a series of channel designating and other service signals in the manner fully described in the above mentioned patent. Following the operation of the numbering machine 48 the same is disconnected and rendered inoperative in the usual manner.

When the relay 82 is energized in response to the energization of relay 81, a locking circuit is completed through the winding of relay 82. This locking circuit may be traced from ground at the make contact of the energized relay 76, the right hand tongue thereof, the left hand tongue and make contact of relay 82 through the winding thereof to negative battery. The operation of relay 82 by means of its right hand tongue and front contact interrupts the circuit therethrough so that a low resistance circuit from ground at the inner tongue of energized relay 81 is not provided for the relays 43 and 44 to reoperate the same when the subsequently operated relay 37 removes ground from the outer and center right hand tongues of the relay 38.

Shortly after the release of the operated one of the cord circuit relays 20, the slow-to-release relay 42, the circuit to which was opened by the energization of relay 38, releases and by means of its grounded tongue completes a circuit to the winding of relay 37, causing relay 37 to be energized. The energization of relay 37 by means of its outer tongue removes the ground from the circuit through the relays 43 and 44, whereupon said relays release with the tongues thereof falling back to their normal positions. The energization of relay 37 by means of its inner tongue and associated back contact opens the circuit to the wiper 25 of the stepping switch 26 to prevent the operation of the stepping magnet 33 when the relay 38 releases at the completion of the switching operation. Following the operation of relay 37, relay 41 releases, opening the holding circuits through the winding of the relays 32 and 38 whereupon said relays release. The release of relay 38 causes the reoperation of relay 42 which in turn causes reoperation of relay 41 and the release of relay 37. Thus the relays are all back to their normal condition ready to respond to another operation which may be initiated by the insertion of another plug 13 associated with another cord circuit into a jack 14. The second plugging operation may occur during the operation of the stepping switch and associated controls in responding to the first plugging operation or following the withdrawal of the first plug from the jack. Thus the single rotary or stepping switch 26 is arranged to space the operations of the supervisory recording equipment even though two plugging operations occur at the same time.

Relays such as 43, one of which is associated with each cord circuit, control the operation of the master receiving recorder while relays such as 44, one associated with each outgoing channel, control the operation of the master sending recorder in a manner that will hereinafter be described.

Each master receiving recorder such as that indicated by the rectangle 18 in Fig. 1 includes a master step magnet 51, a master paper and ribbon feed magnet 52 and a master print magnet 53, besides a print magnet 54, a step magnet 56 and a non-print magnet 57 for each of the individual receiving recording units. There are six recording units in the master recorder represented by the rectangle 18 in Fig. 1. Each recording unit is assigned to a particular cord circuit and a print magnet 54, a step magnet 56 of a recording unit together with the master step, master print and paper feed magnets 51, 53 and 52, respectively, are energized each time a switching operation is performed. The particular print and step magnets that are energized are determined by the particular one of the relays such as 43 in its associated cord circuit. The relay 43 of a cord circuit is energized in the manner set forth above, once for each plugging operation of the associated cord circuit, and the circuits completed by the energization of the relay 43 will now be described.

The uppermost cord circuit of Fig. 1 is shown associated, through the relay 43, with the No. 1 receiving recording unit in the master receiving recorder 18. The energization of the associated relay 43 completes a circuit from ground through the make contact and outer tongue of relay 43 over conductors 58 and 59, through the associated print magnet 54, the winding of a relay 61, to negative battery, causing said print magnet 54 and relay 61 to become energized. A parallel circuit from the grounded make contact and outer tongue of relay 43 is also completed which includes the conductor 58, a first manually operable key 62, the contacts 63 of a second manually operable key 65, the winding of a message number counter magnet 64, the step magnet 56, to negative battery, causing said magnet 64 and step magnet 56 to become energized. On the energization of relay 43 the inner tongue thereof also completes a circuit from the grounded make contact through the winding of the master step magnet 51 to negative battery, causing said magnet to be energized. Thus, on the operation of a relay 43 of a cord circuit, the print and step magnets such as 54 and 56, respectively, of the associated receiving recording unit together with an individual message number counter magnet 64 and a common relay 61 are operated together with the master step magnet such as 51. The energization of the common relay 61 completes a circuit through the windings of the paper and feed magnet 52 and the master print magnet 53 to effect operation thereof. The manner in which recording is effected on the energization of various ones of the magnets as above described of the master receiving recorder will be apparent hereinafter wherein the elements of a master recorder are described. When a number of master receiving recorders are employed at a switching center, the circuits to all of the master step magnets such as 51 may be connected to the conductor 66 by means of other conductors such as 67, so that all the master step magnets operate together. The inner tongues of relays such as 43 of other cord circuits may be connected by conductors 67' to the conductor 66 so that the operaton of any one of the relays 43 also effects operation of all of the master step magnets. The outer tongue of each of the cord circuit relays 43 is connected to its associated sub-recording unit in a manner like that shown.

Each master sending recorder includes a master step magnet 68, Fig. 2, a ribbon and paper feed magnet 69 and a master print magnet 71, together with a plurality of sending recording unit print magnets 72 and step magnets 73. A sending recording unit print magnet 72 and a step magnet 73 in a master sending recorder are assigned to each outgoing channel and are arranged to be energized each time a message is transmitted over their associated channel. The relay 44 of a jack circuit effects operation of its associated sending recording unit in the master sending recorder together with the operation of the master step, print and ribbon feed magnets. The circuit for the No. 1 sending recording unit in the master sending recorder 19, Fig. 2, may be traced from the grounded inner tongue of the relay 44 associated with the upper outgoing channel 15, through the associated print magnet 72 and the winding of a relay 74, to negative battery in parallel with a circuit through key 75 and the step magnet 73 to negative battery. The circuit for the master step magnet 68 is from the grounded outer tongue of relay 44, associated make contact, through the winding of the master step magnet 68 to negative battery. The energization of relay 74 completed a circuit through the paper and ribbon feed magnet 69 and the master print magnet 71. The key 75 permits the step magnet 73 to be stepped independently of the associated relay 44 each time the key is operated. Similar keys may be included, if desired, in the circuits to the master step magnets 51 and 68 so that they may be stepped manually.

From the above described circuits it is evident that a plugging operation effects energization of the associated cord circuit relay 43, Fig. 1, as well as the energization of the relay 44, Fig. 2, associated with the jack circuit in which the plug is placed. The energization of relay 43, as described, effects energization of the print and step magnets 54 and 56, respectively, of its associated receiving recording unit in the master receiving recorder. The energization of relay 43 also effects energization of the master step magnet 51 in the master receiving recorder in which its associated recording unit is located along with all the other master step magnets 51 in other master receiving recorders, if more than one master receiver is employed. There is a relay such as 61 associated with each master receiving recorder and it is energized simultaneously with the energization of a recorder unit print and step magnets 54 and 56 respectively of the associated master recorder. The relay 61 effects energization of the associated paper and ribbon feed magnet 52 and the master print magnet 53. By means of the relay 61 and the arrangements of the circuits all the master step magnets in the master receiving recorders are energized, if more than one master recorder is employed, but only the paper feed and master print magnets 52 and 53, respectively, are energized of the master receiving recorder wherein a recording unit print and step magnets 54 and 56 are energized. Thus, unless a master receiving recorder has a recorder unit print and step magnet energized, its associated master print and ribbon feed magnets 53 and 52 are not energized. However, the master step magnets in all the master receiving recorders are energized on a plugging operation.

The energization of relay 44, Fig. 2, of a jack circuit effects energization of the print and step magnets 72 and 73 of a recorder unit in a master sending recorder and also the master step magnet 68 of all the master recorders, if more than one is employed. The energization of relay 74, which is effected simultaneously with the energization of a print and step magnet 72 and 73, respectively, effects energization of the paper feed and master print magnets 69 and 71 of the master sending recorder in which the energized print and step magnets of a recorder unit are located. Thus, in the same manner as with a master receiving recorder, the master step magnets 68 in each of the master sending records are energized, but only the paper feed and master print magnets 69 and 71 of the master sending recorder having an opeated print and step magnet 72 and 73 are energized.

It sometimes happens that a receiving storage unit 12, Fig. 1, will have an accumulation of tape representing a plurality of untransmitted messages stored therein which are destined to various points, while the receiving storage units of some of the other cord circuits may be idle and have no stored messages. To eliminate the delay which would be incurred if it were necessary that the plurality of stored messages in one receiving storage unit be successively transmitted one at a time through the associated cord circuit, provision for operating the supervisory equipment is made whereby some of such stored messages may be transmitted through the cord circuit associated with empty receiving storage units without adversely affecting the operation of the supervisory equipment. When one receiving storage unit 12 has a plurality of messages stored in its associated tape and some of the others have no stored messages, the attendant at the switching center may take a section of the tape representing some of the mesasges stored therein from the busy cord circuit and place the tape in the transmitter associated with an idle cord circuit. Thus, two or more messages which were received on one receiving storage unit may be simultaneously transmitted through the switching center, provided they are destined for different points, and in this manner the switching center expedites the relaying of the messages.

As pointed out above, a circuit is completed to a message number counter magnet 64 each time a step magnet such as 56 is energized in a receiving recording unit. The message number counter is provided so that the attendant can check the numbers assigned to the messages ordinarily transmitted from a cord circuit. Such message numbers usually correspond to the number assigned to a message as it is received at the receiving storage equipment. The messages receiver are numbered usually consecutively at the point of origin so that successive messages transmitted over a circuit to a receiving storage position bear consecutive message numbers.

If there are a number of messages stored in one receiving storage unit 12 and the operator removes a section of the tape representing, for example, three of these messages for transmission through another cord circuit, the associated message number counter 64 and the step magnet 56 of the recorder unit associated with the cord circuit from which the messages are taken should be energized a like number of times in order to maintain the proper numbering sequence. These extra operations of a message number counter 64 and a recorder unit step magnet 56 are accomplished by the operation of the associated cord circuit key 62, the operation of which completes a circuit from ground at the right hand stop of the key 62, the movable tongue thereof, the contacts 63 of the key 65, the winding of the message number counter magnet 64 and the winding of the step magnet 56 to negative battery. Thus, each time the key 62 is operated, which in this case should be three times, the associated message number counter and the recorder unit step magnet are energized a like number of times, and the numbering sequence for messages received at the associated receiving storage unit will be maintained in the proper order.

When the operator places the section of tape removed from an over-loaded cord circuit in a transmitter of an idle or less busy cord circuit, as above set forth, the key 65 associated with the idle cord circuit is operated during the plugging operations for the messages stored in such sections of tape. With the key 65 operated, the non-print magnet 57 of the heretofore idle cord circuit recorder unit is energized and, in a manner hereinafter described, prevents a recording operation when the associated recorder unit print magnet 54 is subsequently energized as the result of the energization of its cord circuit relay 43. The operation of the key 65 also opens its contacts 63 to open the circuit to its associated message number counter magnet 64 and recorder unit step magnet 56. Accordingly, when the relay 43 of the cord circuit in whose associated tape transmitter the section of the tape was placed is energized, the step magnet 56 in the associated recorder unit will not be energized. Also, with the associated non-print magnet 57 energized, the subsequent energization of the print magnet 54 effects printing of an asterisk or some suitable character on the associated recording blank in a manner hereinafter described concomitantly with the energization of the master print and paper feed magnets 53 and 52, respectively. The enerization of the relay 43 effects energization of the master step magnet 51 in the usual manner. Thus, when a non-print key 65 of a cord circuit is held depressed during a plugging operation, the step magnet 56 and message number counter 64 are not operated, and instead of printing a number on the energization of the associated print magnet 54 a special symbol is recorded due to the energization of the non-print magnet 57. Accordingly, when stored tape representing messages is transferred from one storage unit 12 to another for transmission through an idle or a second cord circuit, there is no advancement of the numbering mechanism of the second cord circuit for such messages. However, a record is made to indicate the circuits over which such messages are received and transmitted and the proper message numbering sequence maintained. The attendant may, if desired, make a notation, for example, beside the special character recorded when a print magnet is energized with its non-print magnet operated to indicate the cord circuit from which the section of tape representing the associated message was taken. By the above arrangement it is apparent that the supervisory equipment has considerable flexibility and can be adapted to operate and indicate the source and destination of messages involved in the switching operations under varying conditions.

The master sending recorders and the master receiving recorders are constructed preferably along the same lines and may be used interchangeably, although when a master receiving recorder is employed as a master sending recorder all the elements thereof may not function. A master receiving recorder, as indicated by the rectangle 18, Fig. 1, includes the individual recording units for indicating associated channels over which messages are received, while the master sending recorder 19 of Fig. 2 includes the individual units for indicating the channels over which messages are transmitted. Referring now to Figs. 3 to 10, the manner in which the elements of a master receiving recorder are arranged will be described. As set forth hereinbefore, each receiving recording unit includes a print magnet, a step magnet and a non-print magnet. In addition to the above magnets, each recording unit includes a pair of number wheels 79, best shown in the enlarged detailed view, Fig. 8. The number wheels 79 have arranged around the periphery thereof ten consecutive numbers, 1 to 0, and all the number wheels of each recording unit in a master recorder are arranged in a row on a common shaft 85.

Figure 8:
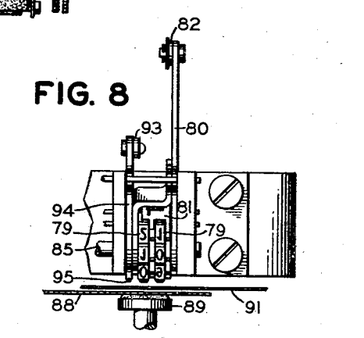
Fig. 8 is a detailed view of one of the recording units included in the master recorder.

The right hand number wheel 79 of the unit shown in Fig. 8 may be termed a "ones" number wheel, while the left hand wheel may be termed a "tens" number wheel. The operation of a step magnet 56, as hereinbefore described, advances the "ones" number wheel one digit for each operation thereof, while the "tens" number wheel is stepped one digit for each revolution of the "ones" number wheel in the manner employed in well-known numbering or counting devices.

Figure 9:
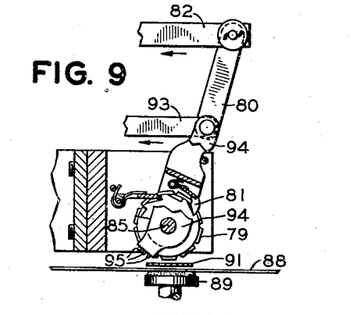
Fig. 9 is a side view of the elements shown in Fig. 8.

The advancement of the number wheels 79 of a recording unit is effected through an operating arm 80 which carries an operating pawl 81, Fig. 9. The operating arm 80 is connected through a link 82, a bell crank 83, Fig. 4, and a second link 84 to the plunger 86 of the associated step magnet 56. A retractile spring 87 returns the above elements to their normal position following the energization of the step magnet 56 and the stepping of the number wheels 79 is effected during the return of these elements to their normal position.

Figure 4:
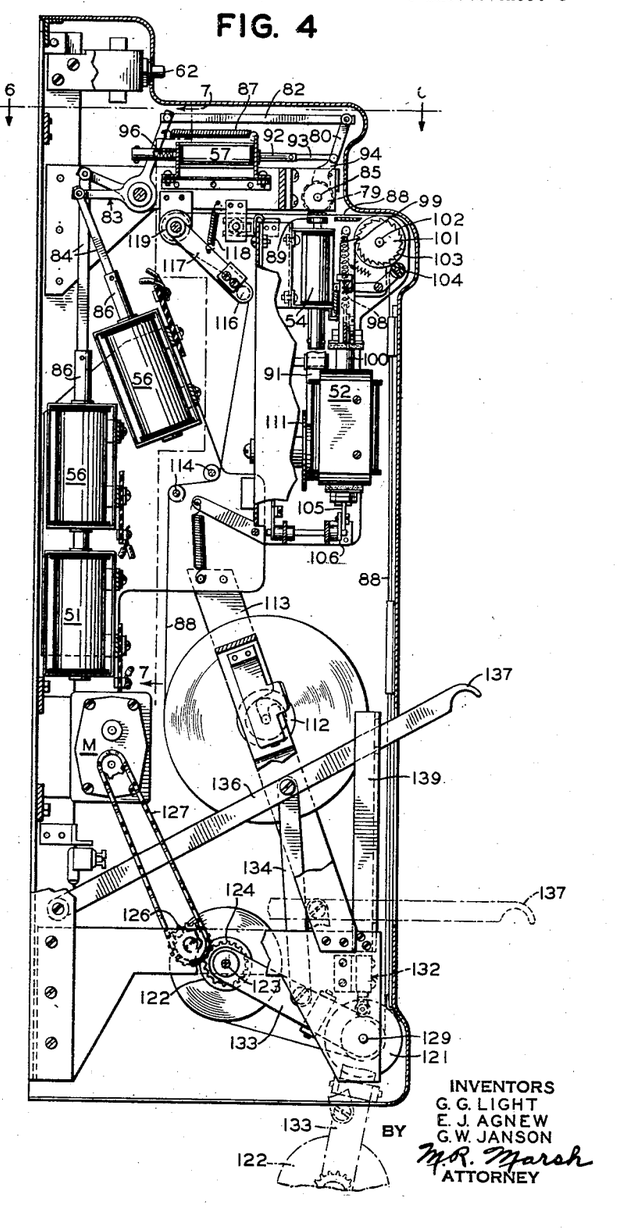
Fig. 4 is a vertical view, partly in section, of the master receiving or sending recorder.
Figures 5, 10:
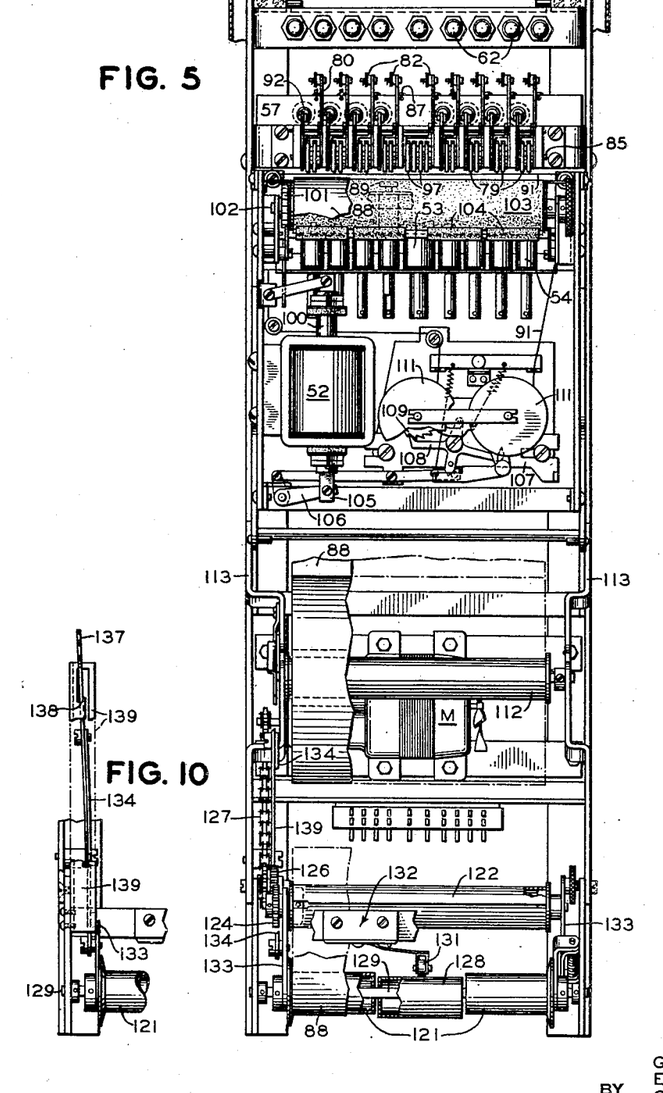
Fig. 5 is a front elevational view, partly in section, of the master recorder with the cover removed.
Fig. 10 is a detailed view of some of the elements of Fig. 5.
Figure 6:
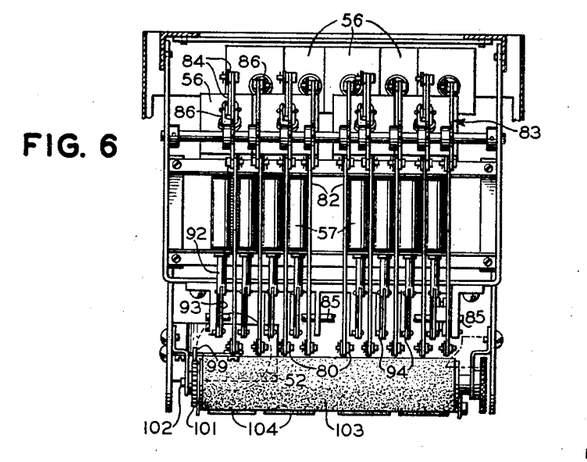
Fig. 6 is a horizontal sectional view taken substantially on line 6—6 of Fig. 4.
Figure 7:
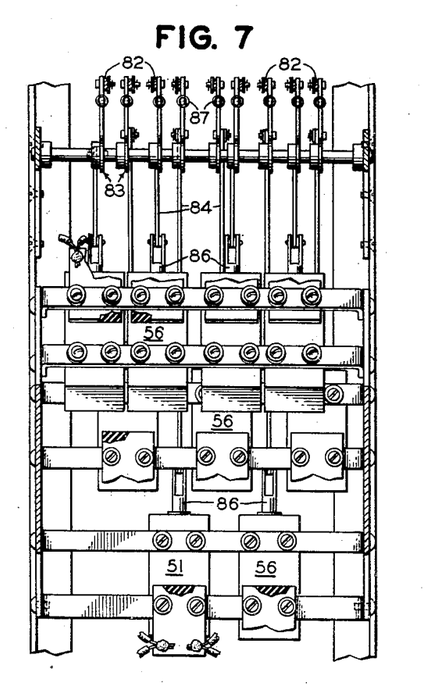
Fig. 7 is a fragmentary vertical sectional view taken on line 7—7 of Fig. 4.

Arranged to pass beneath the number wheels of all of the recording units is a recording paper 88 of sufficient width for a common transverse section thereof to be in operative relation with the number wheels of all of the recording units. As shown in Figs. 4 and 5, the print magnet 54 of each recorder unit is located below its associated number wheels and includes a print hammer 89 operated by the associated magnet. The energization of a print magnet 54 moves the print hammer 89 upward to force the recording paper into engagement with an inking ribbon 91 and the associated number wheels to record the number set up on the wheels on the recording paper 88. The inking ribbon 91 located between the number wheels 79 and the recording paper serves to provide the ink for recording the numbers set up on the number wheels.

The non-print magnet 57 of each recorder unit, when operated in a manner hereinafter described, prevents the recording of the number of the associated number wheels and effects recording instead of a special character such as an asterisk. The plunger 92, Fig. 4, of a non-print magnet 57 has attached thereto a link 93 which in turn is connected to a member 94, Figs. 8 and 9, pivotally mounted on the number wheel shaft 85. The lower end 95 of the member 94 has formed thereon a special character such as an asterisk. When the associated non-print magnet 57 is unenergized, the end 95 of the member 94 will be, as shown in Fig. 9, at some position other than directly over the associated print hammer 89 and in such a position will not interfere with the normal printing of the numbers or the number wheels. However, on the energization of a non-print magnet 57, the member 94 is pivoted to place the lower end 95 thereof carrying the special character directly over the associated print hammer 89. The lower end 95 of the member 94 extends a slight distance beyond the periphery of the number wheels 79 so that with the end 95 over the print hammer 89 subsequent energization of the print magnet 54, the print hammer 89 forces the recording paper 88 and inking ribbon 91 into engagement with the lower end 95 to effect recording of the special character thereon instead of the number set up on the number wheels 79. Thus, a special character is recorded on the recording paper when a print magnet is energized with its associated non-print magnet energized. On deenergization of a non-print magnet 57 a spring 96, Fig. 4, returns its associated elements to their normal position with the lower end 95 of the member 94 out of printing relation with the associated print hammer 89.

Figure 3:
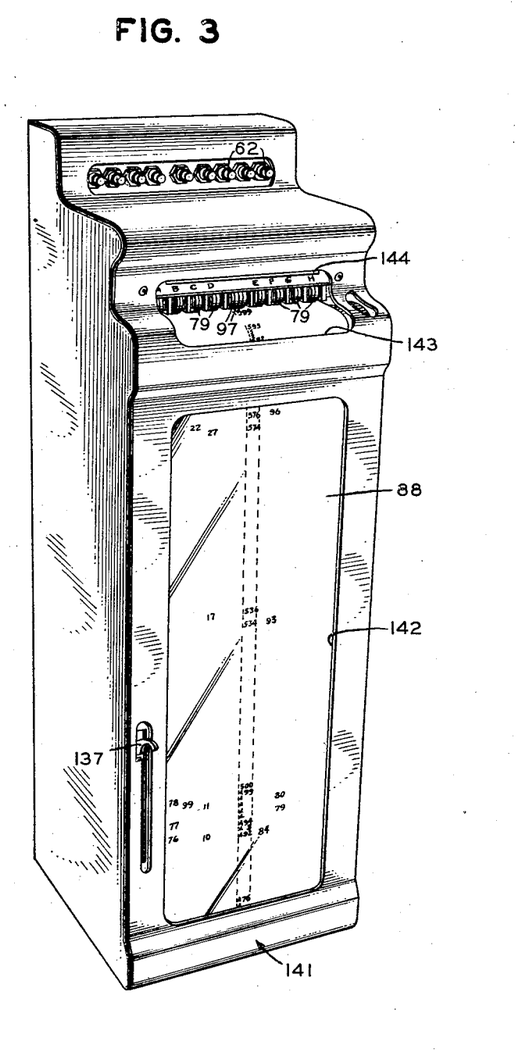
Fig. 3 is a perspective view of a master sending or receiving recorder which may be employed in connection with the circuit diagram shown in Figs. 1 and 2.

Adjacent the center of the number wheel shaft 75 are the set of four master number wheels 97, Figs. 3 and 5. These master number wheels 97 are advanced one digit at a time on each operation of the associated master step magnet 51, Figs. 1 and 7, through elements similar to those employed to advance the recorder unit number wheels 79. Recording of a number from the master wheels 97 is effected by the master print magnet 53, Figs. 5 and 7, which upon energization forces the recording paper and inking ribbon into engagement with the master number wheels to record a four-digit number on the recording paper 88.

Each master recorder has a paper and ribbon feed magnet 52, Figs. 4 and 5, the plunger 100 of which is normally held in its upper position by a spring 98. On energization of the said feed magnet an associated pawl 99 is lowered so as to engage a lower tooth on a ratchet wheel 101 and on subsequent deenergization of the magnet 52, the spring 98 is effective to rotate the ratchet wheel 101. The ratchet wheel 101 is fixed to a shaft 102 for rotation therewith, to which is also fixed a paper feed roller 103. Spring-pressed pressure rollers such as 104 hold the recording paper 88 in engagement with the feed roller 103 so that the paper is advanced as the feed roller rotates. Thus, each time the magnet 52 is deenergized, the recording paper 88 is advanced a predetermined amount.

Attached to the lower end of the plunger 100 of the paper and ribbon feed magnet 52 by a link 105 is a bell crank 106 which, on energization of the magnet 52, operates a slide 107 to the right. The slide 107 carries a double armed pawl 108 which cooperates with feed ratchets such as 109 on inking ribbon spools 111 to advance the inking ribbon 91 when the magnet 52 is deenergized. The inking ribbon advancing mechanism may be similar to that employed in calculating or other similar machines.

The recording paper 88 is supplied from a roll carried on a bobbin 112, Fig. 4, removably supported in bracket members 113. As the recording paper 88 unwinds from the supply roll, it passes upward over guide members 114 and then over a rod 116 supported in the free ends of pivoted arms 117. The arms 117 have a spring 118 attached thereto, and the spring provides a takeup for the paper. From the rod 116 the paper passes over a roller 119 and then horizontally toward the front of the recorder, where it passes between the number wheels 79 and 97 and the print hammers such as 89. As the paper passes from underneath the number wheels 79, it next encounters the feed roller 103 which is stepped in the manner described to advance the paper. As the paper leaves the feed roller 103, it is guided down the front of the recorder to a roller 121 adjacent the bottom of the recorder so as to provide a long section of the recordings for observation. The paper passes from the lower roller 121 to the takeup spool 122 mounted on a shaft 123 which has a gear 124 rotatable therewith. Another gear 126 meshes with the gear 124 and is driven from a motor M by means of a chain 127 and sprockets.

The bottom guide roller 121, Fig. 5, has a center section 128 which is loose on the associated shaft 129 and cooperates with an associated roller 131 adapted to operate a switch indicated in general by reference numeral 132. The switch 132 controls the circuit to the motor M, and when the paper is sufficiently loose about the lower guide roller 121 to permit the center section 128 to drop to the position shown in Fig. 5, the circuit to the motor M is closed. On the closing of the motor circuit, the takeup spool 122 is rotated to wind the loose recording paper thereabout, which then elevates the center section 128 of the lower guide roller 121 to effect opening of the contacts of the switch 132 to stop the motor M. Thus, as the paper is advanced from the feed wheel 103, the motor M effects winding up of the same about the take-up spool 122.

The takeup spool 122 is supported on the free ends of arms 133, Fig. 4, which are pivoted concentrically with the shaft 129. Attached to one of the arms 133 is a link 134, the upper end of which is secured adjacent the center of an operating lever 136. The operating lever 136 is pivotally mounted at its left hand end and the right hand end has formed thereon a handle 137 which extends through the front of the recorder cover. By lifting the handle 137 a slight amount and moving the same to the right to clear a ledge 138, Fig. 10, in a guide member 139, it may then be lowered to the position shown by the dot-dashed outline thereof in Fig. 4. The lowering of the operating arm 136 to such a position swings the arms 133 downward so that the takeup spool 122 carried therein is moved out through an opening in the bottom of the cover to some such position as that shown dot-dashed. With the take-up spool in this position, the recording paper may be unrolled therefrom so that numbers recorded a long way back may be inspected.

As shown in Fig. 3, the front of the cover 141 of the recorder has an elongated opening 142 which permits exposure of a considerable portion of the recording paper after the same has passed underneath the number wheels. Another opening 143 at the upper front part of the cover 141 permits viewing of the recording paper 88 just as it leaves the number wheels. In the preferred embodiment of the recorder it has a small channel 144 mounted just above the number wheels which may contain a printed strip with designating characters thereon to designate the channels of the recording unit with which the several sets of number wheels are associated.

The above-described master recorder would be a master receiving recorder, and a similar unit could be employed for a master sending recorder, although when such a unit is employed as a sending recorder the non-print magnets would not be operative. Referring to the previously described system, it will be remembered that all the master step magnets in the master sending recorders and all the master step magnets in the master receiving recorders are energized for each switching operation, and concomitantly therewith a print magnet in a receiving recording unit and one in a sending recording unit associated with the channels involved in the switching operation are also energized. Thus, a number is recorded by the receiving recording unit which represents the number assigned to a particular message received over a given receiving channel and another number for the number of the particular message transmitted over a particular sending channel. These message numbers are printed concomitantly with the printing of the master numbers in only their associated master recorders. Following the printing, the paper is advanced and all the master number wheels are stepped one digit together with the stepping of the number wheels of the recording units involved. As the master numbers are consecutive and represent consecutive switching operations, all master numbers that are printed at a time are the same. Furthermore, only two message numbers, a received message number and a transmitted message number, will be recorded in transverse alignment with the same master number. Thus, if message number 59, for instance, over a sending channel was reported lost, the attendant would determine the master number printed in the same transverse section of the recording paper as the number 59 by this particular recording unit, and by the number printed in transverse alignment with the same master number on a receiving recorder determine the number of the received message involved, and by the position thereof the receiving channel over which the message was received. Thus, by means of the system and mechanism disclosed herein a recording mechanism and a system for operating the same is provided whereby the circuits and the number of messages involved in each switching operation at a switching center may be automatically indicated, and a permanent record made thereof. Such a system and apparatus greatly facilitates tracing of lost and mutilated messages.

It is obvious, of course, that various modifications and arrangements of the system described herein and the apparatus for effecting recording may be made without departing from the spirit or essential attributes of the invention, and it is desired, therefore, that only such limitations be placed thereon as are imposed by the prior art or are specifically set forth in the appended claims.

What is claimed is:

1. In a telegraph exchange system, an exchange or switching office, a plurality of lines or channels terminating at said exchange or office, switching means for interconnecting said lines in pairs to enable messages to be sent from any of said lines or channels over any other desired one of said lines or channels, supervisory recording means to make a record for each switching connections from which the identity of the particular connected lines or channels involved in each connection may be determined, said recording means including a separate recording device for each line or channel, and means for actuating the two recording devices of the lines involved in each switching connection by and in response to such connection.

2. In a telegraph exchange system, an exchange or switching office, a plurality of lines or channels terminating at said exchange or office, switching means for interconnecting said lines in pairs to enable messages to be sent from any of said lines or channels over any other desired one of said lines or channels, supervisory recording means to make a record for each switching connection from which the identity of the particular connected lines or channels involved in each connection may be determined, means to actuate said recording means for each switching connection and means to effect separate non-simultaneous actuations of the recording means when two or more switching connections are made simultaneously.

3. In a telegraph exchange system, an exchange or a switching office, sending and receiving positions in said office comprising telegraph repeaters, switching means for interconnecting any of said receiving positions to any desired one of said sending positions to relay messages through said office, supervisory recording means to make a record for each switching connection from which the identity of the particular connected positions for each connection may be determined, said recording means including a separate recording device for each position, and means for actuating the two recording devices of the receiving and sending positions involved in each switching connection in response to such connection.

4. In a telegraph exchange system, an exchange or switching office, a plurality of telegraph circuits, switching means for interconnecting said circuits to enable messages to be repeated from one circuit to a selected circuit, supervisory recording means to make a record for each switching connection from which the identity of the particular connected circuits involved in each connection may be determined, said recording means including a separate numerical counter for each circuit and a master numerical counter common to all of the circuits, and means for actuating said counters by and in response to the operation of said switching means.

5. In a telegraph exchange system, an exchange or switching office, a plurality of telegraph circuits, switching means in said office for interconnecting said circuits to enable messages to be sent from any circuit to any other desired circuit, supervisory recording means to make a record of each switching connection from which the identity of the particular connected circuits involved in each connection may be determined, said recording means including a separate recording device for each circuit, master recording means common to all the circuits, and means for operating said master recording means to print a master number each time the switching means is operated and to print a corresponding number on the recorders individual to the circuits involved in a particular connection whereby the circuits involved in each connection through the exchange may be subsequently determined.

6. In a telegraph system, a switching office, a plurality of incoming and outgoing lines or channels terminating at said office, switching means for interconnecting the incoming lines to the outgoing lines as desired, individual recording devices one for each of said lines arranged in groups, said recording devices including printing magnets and number wheel stepping magnets and each of said groups having associated therewith a master print magnet and a master number wheel stepping magnet, and means operative on the interconnection of incoming and outgoing lines for operating the printing and number wheel stepping magnets of the recording devices of the lines involved in the switching operation, the master number wheel stepping magnets of each of said groups of recording devices and the master print magnets of the groups having operated recording device magnets to record indications of the lines involved in a switching operation.

7. In a telegraph exchange system, a switching office having incoming and outgoing lines terminating thereat, message receiving and message transmitting mechanisms associated with said incoming and outgoing lines respectively, means for interconnecting any one of said message receiving mechanisms to any one of said message transmitting mechanisms for relaying a message through said office, recording devices associated with each of said receiving and transmitting mechanisms, means including said recording devices to consecutively number messages received and transmitted through associated mechanisms, and means to indicate the message numbers and the receiving and transmitting mechanisms involved in each interconnection.

8. In a telegraph system, a switching office, a plurality of receiving and a plurality of sending lines terminating at said office, means for switching a message from any one of said receiving lines to any desired one of said sending lines, means for numerically and consecutively numbering and recording the numbers of consecutive messages received and transmitted over individual lines, means for consecutively numbering and recording the numbers of consecutive switching operations at said office, and means including said recorded numbers for indicating the lines and the respective message numbers involved in the switching operations.

9. In a telegraph exchange system, a switching office, a plurality of lines terminating at said office, receiving storage positions associated with incoming of said lines and transmitting storage positions associated with the outgoing of said lines, switching means associated with said positions for transferring messages from any of said receiving storage positions to any desired one of said transmitting storage positions, recording mechanism associated with said switching means, and means including said recording mechanism automatically operative on each operation of said switching means to indicate the receiving and transmitting storage positions involved in each switching operation and the sequence of all switching operations at such switching office.

10. In a telegraph exchange system, a switching office, a plurality of lines terminating at said office, receiving storage positions associated with incoming of said lines and transmitting storage positions associated with the outgoing of said lines, switching means associated with said positions for transferring messages from any of said receiving storage positions to any desired one of said transmitting storage positions, said switching means including plugs and jacks and a sequencing device, the insertion of a plug in a jack incident to a switching operation initiating the operation of said sequencing device, recording devices controlled by said switching means to indicate the receiving and storage positions involved in each switching function and means including said sequencing device to space in time the operation of said recording devices when two or more switching operations are made simultaneously.

11. In a telegraph exchange system, a switching office, a plurality of lines terminating at said office, receiving storage positions associated with incoming of said lines and transmitting storage positions associated with the outgoing of said lines, switching means associated with said positions for transferring messages from any of said receiving storage positions to any desired one of said transmitting storage positions, individual recording means associated with each receiving storage position, master recording means common to all of said receiving storage positions, means operative on switching operations to operate the individual recording means of the receiving positions involved and the master recording means to indicate by recordings the receiving positions involved in each switching operation and the sequence in which said positions are involved.

12. In a telegraph exchange system, a switching office, a plurality of lines terminating at said office, receiving storage positions associated with incoming of said lines and transmitting storage positions associated with the outgoing of said lines, switching means associated with said positions for transferring messages from any of said receiving storage positions to any desired one of said transmitting storage positions, individual recording means associated with each transmitting storage position, master recording means common to all of said transmitting storage positions, means operative on switching operations to operate the individual recording means of the transmitting positions involved and the master recording means to indicate by recordings the transmitting positions involved in each switching operation and the sequence in which said positions are involved.

13. In a telegraph exchange system, a switching office, a plurality of lines terminating at said office, receiving storage positions associated with incoming of said lines and transmitting storage positions associated with the outgoing of said lines, switching means associated with said positions for transferring messages from any of said receiving storage positions to any desired one of said transmitting storage positions, individual recording devices associated with each receiving and transmitting storage position, master recording means common to all of said receiving and transmitting storage positions, means controlled by said switching means on the transfer of messages from receiving to transmitting positions and including the individual recording devices of the positions involved and the master recording means to record indications to represent the positions involved in each switching operation and the sequence in which said positions are involved.

14. In a telegraph exchange system, a switching office, a plurality of telegraph lines terminating at said office, switching measn for transferring messages received over incoming of said lines to desired outgoing ones of said lines, recording means and means operative concomitantly with said switching means and in response thereto to automatically operate said recording means to indicate the lines involved in each switching operation and the order in which said switching operations are made.

15. In a telegraph exchange system, a switching office, a plurality of telegraph lines terminating at said office, switching means including plugs and jacks for extending incoming ones of said lines to desired outgoing ones of said lines by the insertion of respective plugs in respective jacks, recording means at said switching office, and means automatically operative on the insertion of a plug in a jack for controlling said recording means to make recordings indicative of the lines involved in each switching operation and the respective sequence in which said lines are involved.

16. In a telegraph repeater system, a plurality of receiving and sending positions, means at said positions for repeating telegraph signals, switching apparatus for interconnecting any of said receiving and any of said sending positions, recording means, said recording means including recording units individual to each of said positions and master recording units common to a plurality of said positions, means automatically operative on a switching operation to actuate the individual recording units of the positions involved and only the master recording units common thereto to indicate by the recordings thereof the lines involved and the sequence of involvement.

17. In a telegraph repeater system, a plurality of receiving and sending positions, means at said positions for repeating telegraph signals, switching apparatus for interconnecting any of said receiving and any of said sending positions, recording means comprising individual recording units for each position, master recording units common to a plurality of said positions and recording media, means for automatically operating the individual recording units of the lines involved in a switching operation and the master recording units common thereto, and means dependent upon the recordings of the master recording units, the recordings of the individual units and the position of the latter on said recording media for producing a record of the positions involved in switching operations and the sequence in which they are involved.

18. In a telegraph system, a switching office, a plurality of incoming and outgoing lines or channels terminating at said office, switching means for interconnecting the incoming lines to the outgoing lines as desired, individual recording devices one for each of said lines arranged in groups, said recording devices including printing magnets and number wheel stepping magnets and each of said groups having associated therewith a master print magnet and a master number wheel stepping magnet, means normally automatically operative on the interconnection of incoming and outgoing lines for operating the printing and number wheel stepping magnets of the recording devices of the lines involved in the switching operation, the master number wheel stepping magnets of each of said groups of recording devices and the master print magnets of the groups having operated recording device magnets to record indications of the lines involved in a switching operation, and manually operative means the operation of which prevents the operation of predetermined of the magnets of individual recording devices of predetermined of the lines when said lines are involved in switching operations.

19. In a telegraph system, a switching office, a plurality of incoming and outgoing lines or channels terminating at said office, switching means for interconnecting the incoming lines to the outgoing lines as desired, individual recording devices one for each of said lines arranged in groups, said recording devices including printing magnets and number wheel stepping magnets and each of said groups having associated therewith a master print magnet and a master number wheel stepping magnet, means normally automatically operative on the interconnection of incoming and outgoing lines for operating the printing and number wheel stepping magnets of the recording devices of the lines involved in the switching operation, the master number wheel stepping magnets of each of said groups of recording devices and the master print magnets of the groups having operated recording device magnets to record indications of the lines involved in a switching operation, manually positionable keys associated with said incoming lines, one key to a line, and means operative with a key in one position to disable the stepping magnet of the associated recording device to step its number wheels when its line is involved in a switching operation.

20. In a telegraph system, a switching office, a plurality of incoming and outgoing lines or channels terminating at said office, switching means for interconnecting the incoming lines to the outgoing lines as desired, individual recording devices one for each of said lines arranged in groups, said recording devices including printing magnets and number wheel stepping magnets and each of said groups having associated therewith a master print magnet and a master number wheel stepping magnet, means normally automatically operative on the interconnection of incoming and outgoing lines for operating the printing and number wheel stepping magnets of the recording devices of the lines involved in the switching operation, the master number wheel stepping magnets of each of said groups of recording devices and the master print magnets of the groups having operated recording device magnets to record indications of the lines involved in a switching operation, manually positionable keys associated with said incoming lines, one key to a line, means operative with a key in one position to disable the stepping magnet of the associated recording device to step its number wheels when its line is involved in a switching operation, and means operative with the stepping magnet of a recording device disabled to record a predetermined symbol when the associated line is involved in switching operations.

GEORGE G. LIGHT.
EDWARD J. AGNEW.
GEORGE W. JANSON.